United States Patent [19]

Kogane et al.

[11] Patent Number: 4,903,100

[45] Date of Patent: Feb. 20, 1990

[54] LONG STRIP MATERIAL HANDLING APPARATUS

[75] Inventors: Mikio Kogane; Tsutomu Kimura, both of Tokyo, Japan

[73] Assignee: Fuji Photo Film Co., Ltd., Kanagawa, Japan

[21] Appl. No.: 308,579

[22] Filed: Feb. 10, 1989

[30] Foreign Application Priority Data

Feb. 10, 1988 [JP] Japan .................................. 63-29493
Feb. 10, 1988 [JP] Japan .................................. 63-29494
Feb. 10, 1988 [JP] Japan .................................. 63-29495

[51] Int. Cl.$^4$ ...................... G03B 27/32; G03D 3/13
[52] U.S. Cl. ...................... 357/27; 354/298; 354/321; 354/322; 354/339; 226/108; 226/113; 226/118
[58] Field of Search ............... 354/319, 320, 321, 322, 354/339, 298; 355/27, 28; 226/104, 108, 113, 118

[56] References Cited

U.S. PATENT DOCUMENTS

| | | | |
|---|---|---|---|
| 4,115,817 | 9/1978 | Suzuki et al. | 355/28 |
| 4,260,234 | 4/1981 | Burton | 355/28 |
| 4,639,118 | 1/1987 | Kogane et al. | 355/28 |
| 4,837,601 | 6/1989 | Nakane et al. | 355/28 |

Primary Examiner—A. A. Mathews
Attorney, Agent, or Firm—Sughrue, Mion, Zinn, Macpeak & Seas

[57] ABSTRACT

An apparatus handles and transports long strip materials between a first processing section, with a first transporting roller assembly which transports a long strip material lengthwise at a first speed therein, and a second processing section with a second transporting roller assembly which transports the long strip material lengthwise at a second speed different from the first speed, the strip material passing through a reservoir section with a guide member disposed between the first and second processing sections for temporarily reserving the long and narrow strip material therein in the form of a loop. The long strip material handling apparatus includes a speed changing mechanism for changing the speed of lengthwise transportation of the long strip material to the first or second speed before the leading end of the long strip material passes through the second transporting roller assembly when the second transporting roller assembly first threads the leading end of the long strip material, and a leader sensor for detecting the leading end of the threaded long strip material to provide a signal in response to which the speed changing mechanism is deactuated.

13 Claims, 8 Drawing Sheets

LONG STRIP MATERIAL HANDLING APPARATUS

BACKGROUND OF THE INVENTION

The present invention relates to a long, narrow strip material handling apparatus.

Various long and narrow strip material handling apparatus are well known to those skilled, for example, in the photographic art. A photographic printing-processing apparatus with a long strip handling apparatus generally has various chambers or sections, such as a paper developing section, a paper drying section and a paper cutting section. A long strip of material such as color paper, is withdrawn from a paper magazine to an exposure station in the exposure section for exposure. After exposure, the long strip of color paper is transported to the reservoir section by a paper transporting roller assembly comprising a driving roller and driven or pinch rollers through a paper guide member disposed between the first paper transporting roller assembly and the reservoir section. Then, the long strip of color paper is transported by a second paper transporting roller assembly, comprising driving and driven or pinch rollers, toward the paper cutting section, passing first through the developing section and the drying section. In the paper cutting section, the processed long strip of color paper is cut into individual prints.

In such a printing-processing apparatus, the long strip of color paper generally is transported at different speeds for printing and processing because more time is required in the developing section than in the printing section. For smooth transfer of the long strip of color paper from the printing section to the processing section and, in addition, for efficient print making, the paper reservoir section necessarily is provided between the printing and processing sections for looping and temporarily reserving the printed color paper in the form of a loop.

The long strip of color paper thus temporarily reserved in the reservoir section is transported into the processing section by the second paper transporting roller assembly at a speed slower than that of the first paper transporting roller assembly. To nip the leading end of the long strip of color paper securely between the driving and pinch roller of the the the second paper transporting roller assembly, a movable guide member is provided between the first and second paper transporting roller assemblies. The movable guide member is displaced away from the path of the long strip of color paper to enable the color paper to be looped.

A serious problem with such a long strip material handling apparatus is that because of the difference in speed of the first and second paper transporting roller assemblies, the second paper transporting roller assembly fails to up the long strip of color paper. Alternatively, there may be jamming.

SUMMARY OF THE INVENTION

In view of the foregoing, it is an object of the present invention to provide a web material handling apparatus which is used with a pair of web transporting assemblies which transport a web material at different speeds.

It is another object of the present invention to provide a web material handling apparatus which can prevent jamming of a web material.

The above and other objects of the present invention are achieved by providing an apparatus for handling and transporting long and narrow strip materials between a first processing section, with first transporting means which transports a long and narrow strip material lengthwise at a first speed in the first processing section, and a second processing section with second transporting means which transports the long and narrow strip material lengthwise at a second speed different from the first speed. Between the first and second processing sections, there is a reservoir section with a guide member therein for temporarily storing or reserving the long and narrow strip material in a loop therein. The guide member guides the leading end of the long and narrow strip material toward the second processing section and is movable away from the leading end of the long and narrow strip material while the long and narrow strip material is being transported between the first and second processing sections.

The long and narrow strip material handling apparatus includes speed changing means for changing the speed of lengthwise transportation of the long and narrow strip material between the first and second speeds before the leading end of the long and narrow strip material passes through the second transporting means at the beginning of threading the leading end of the long and narrow strip material with the second transporting means. The apparatus further includes a leader sensor for detecting the leading end of the long and narrow strip material threaded and nipped with the second transporting means to provide a signal, in response to which with which the speed changing means is deactuated.

According to a preferred embodiment of the present invention, each of the first and second transporting means has a pair of rollers, both driving and driven rollers. The speed changing means changes the speed of the first transporting means to transport the long and narrow strip material at the second speed in the absence of the signal from the leader sensor, and at the first speed in the presence of the signal from the leader sensor.

According to another preferred embodiment of the present invention, each of the first and second transporting means has a pair of rollers both driving and driven rollers. The speed changing means changes the speed of the second transporting means to transport the long and narrow strip material at the first speed in the absence of the signal from the leader sensor and at the second speed in the presence of the signal from the leader sensor.

According to yet another preferred embodiment of the present invention, each of the first and second transporting means has a pair of rollers, both driving and driven rollers. The speed changing means includes roller separating means which separates the pair of rollers of the second transporting means from each other when the long and narrow strip material passes between the pair of rollers in the absence of the signal from the leader sensor, to allow the long and narrow strip material to be transported at the first speed in the absence of the signal from the leader sensor, and to bring one roller in contact with the other to nip and transport the leading end of the long and narrow strip material therewith at the second speed in the presence of the signal from the leader sensor after the long and narrow strip material has passed between the pair of rollers.

BRIEF DESCRIPTION OF THE DRAWINGS

The above described and other objects of the present invention will become apparent from the following description taken in conjunction with preferred embodiments thereof with reference to the accompanying drawings, in which the same reference numerals designate the same or similar parts throughout the several views, and wherein.

DETAILED DESCRIPTION OF THE PREFERRED EMBODIMENTS

Figure 1:
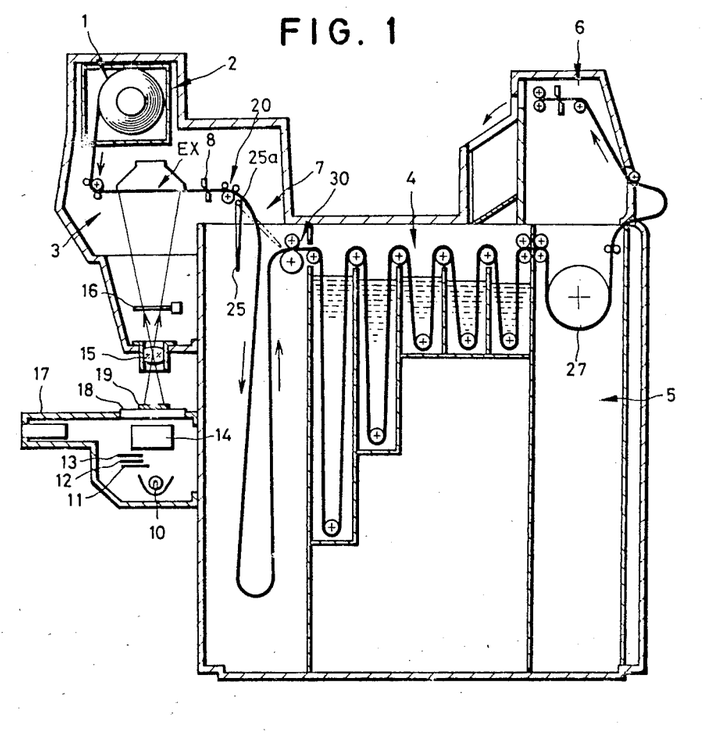
FIG. 1 is a fragmentary sectional view showing a printing-processing apparatus in which the present invention is embodied.

FIG. 1 shows a color printing-processing apparatus in which the present invention is embodied. The apparatus includes a printer section 3, a paper processing section 4, a color paper drying section 5 and a cutting section 6. On the top, the printing-processing apparatus has removably mounted thereon a paper magazine 2 in which a roll of a long strip of color paper 1 is contained. The color paper 1 is withdrawn, one frame at a time, in a well known manner and is placed in position at an exposure station EX in the exposure section 3.

Under an exposure chamber 3A. there is a table 17 on which a film holder 18 is disposed to hold a color negative film 19. A lamp 10 is provided under the film holder 18 to illuminate the color negative film 19 held in the film holder 18 through three color filters 11. 12 and 13 for cyan, magenta and yellow respectively. As is well known in the art, by passing the light from the lamp 10 through the color filters 11, 12 and 13, three color components of light can be adjusted as desired to provide an appropriate printing light. After passing through a mirror box 14 and thus being uniformly mixed the printing light illuminates the color negative film 19. The long strip of color paper 1 is exposed to the illuminated color negative film 19 through a printing lens 15 and a shutter 16.

On the right side of the exposure station EX as viewed in FIG. 1, there are a cutter 8 for cutting off the exposed part of the color paper 1 to a predetermined length of relatively long strips and a first paper transporting roller assembly 20 which will be described later. Adjacent to the first film transporting roller assembly 20, there is a movable guide member 25. The first film transporting roller assembly 20 transports the exposed color paper 1 into a reservoir section 7 wherein the exposed color paper 1 is reserved in the form of a loop for a period of time. In this reservoir chamber 7 there is a second paper transporting roller assembly 30 which will be described in detail later.

In the paper processing section 4 for photographically processing the exposed color paper 1, there are various processing tanks, namely a developing tank, a bleaching-fixing tank, and three consecutive washing tanks. The exposed color paper 1 passes through these processing tanks for color processing.

A dryer drum 27 is provided in the drying section 5 for drying the processed color paper 1. A cutter section 6 is mounted in the drying section 5. With a cutter in the cutter unit 6, the processed and dried color paper 1 is cut into individual color prints.

Figure 2:
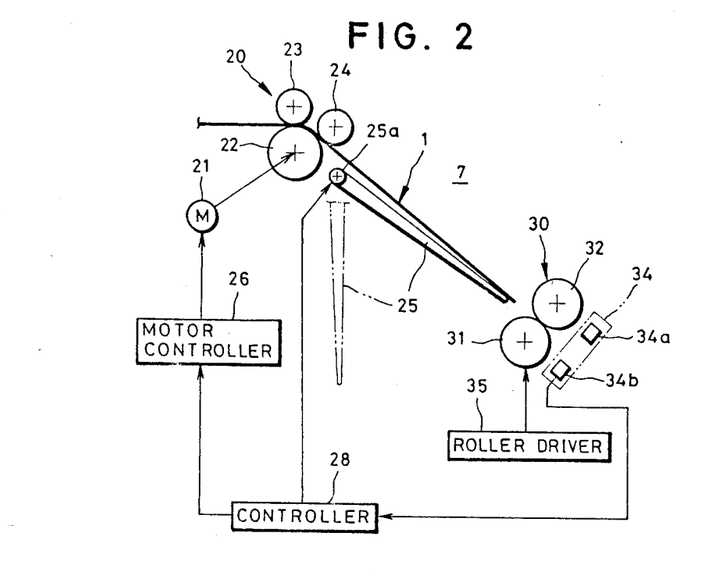
FIG. 2 is a schematic illustration of a long and narrow strip material handling apparatus according to a preferred embodiment of the present invention incorporated in the printing-processing apparatus of FIG. 1.

FIG. 2 shows the first and second paper transporting roller assemblies 20 and 30 of the long strip handling apparatus. As shown, the first paper transporting roller assembly 20 includes a driving roller 22 operationally connected to a pulse motor 21, and a pair of driven or pinch rollers 23 and 24. The pulse motor 21 is controlled to vary its speed under the control of a motor controller 26 working as a paper speed changing means.

The movable guide member 25 is provided close to and after the first paper transporting roller assembly 20 which is controlled to turn up and down by the aid of a controller 28. When the guide member 25 is turned up as shown in FIG. 2, it guides the leading section of the long strip of color paper 1 toward the second paper transporting roller assembly 30 comprising a driving roller 31 and a driven or pinch roller 32.

Close to and behind the second paper transporting roller assembly 30, there is a paper sensor 34 such as photoelectric detector comprising a light emitter 34a and a photo detector 34b for detecting the leading end section passing therebetween to provide a signal. The second paper transporting roller assembly 30, in particular the driving roller 31, is driven by a roller driver 35. At the beginning of transportation of the long strip of color paper 1, the roller driver 35 drives the second paper transporting roller assembly 30 to transport the long strip of color paper 1 at a rate or speed equal to a speed at which the the first paper transporting roller assembly 20 transports the long strip of color paper 1.

Figure 3:
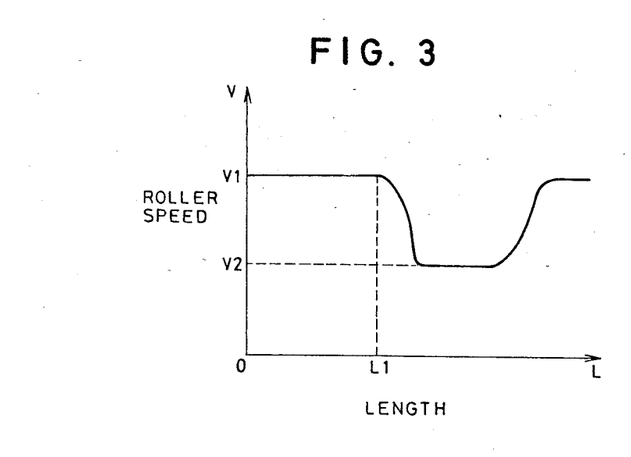
FIG. 3 is a graph showing the relationship of transporting speed of a second transporting roller assembly to material length.

The motor controller 26 controls the motor 21 to increase or decrease its speed of rotation between a high speed V1, at which the first paper transfer roller assembly usually transports the long strip of color paper, and a low speed V2, at which the second paper transporting roller assembly 30 transports the long strip of color paper in the presence of an instruction signal from a controller 28. Such will be described in detail later. The curve of FIG. 3 shows the change of linear speed V of the driving roller 22 by the control of the controller 28.

When receiving a signal from the leader sensor 34, the controller 28 controls the movable guide member 25 and motor controller 26. Looking at this operation in greater detail, at the beginning of operation when the leader of the color paper 1 is not cauthg between rollers of the second paper transporting roller assembly 30, the controller 28 receives no signal from the leader sensor 28, and accordingly causes the guide member 25 to turn up about a shaft 25a in a guide position where the guide member 25 guides the leader of the color paper 1. When the leader of the color paper 1 gets close to the rollers 31 and 32 of the second paper transporting roller assembly 30, the controller 28 provides the motor controller 26 with a deceleration signal to decelerate the pulse motor 21 to reduce the speed V1 of transportation of the color paper 1 transported by the pulse motor 21 to a low speed V2, at which the color paper 1 is transported in the processing section 4, from a high speed V1, at which the color paper 1 is transported in the printing section 3 as shown in FIG. 3.

Such operation is effected, for example, by tracking the leader of the color paper 1 to detect the leader of the color paper 1 approaching a position close to the rollers 31 and 32 of the second paper transporting roller assembly 30. Tracking can be performed by counting pulses applied to the pulse motor 21 necessary to transport the leader of the color paper 1 by a predetermined distance L1 from the center of the exposure station EX to the position close to the rollers 31 and 32 of the second paper transporting roller assembly 30.

When the rollers 31 and 32 of the second paper transporting roller assembly 30 grab the leader of the color paper 1 and the leader sensor 34 provides a signal, the controller 28 provides the motor controller 26 with an acceleration signal to accelerate the pulse motor 21 so as to increase the speed V of transportation of the color paper 1 transported by the pulse motor 21 to the high speed V1 from the low speed V2, and simultaneously causes the guide member 25 to turn down away from the color paper 1.

In operation, at the beginning of operation of the long strip handling apparatus, the controller 28 decides that the printing-processing apparatus is at the beginning of operation based on the absence of a signal from the leader sensor 34. Accordingly, the controller 28 causes the guide member 25 to turn up to the guide position. Before the leader of the color paper 1 approaches a position close to the rollers 31 and 32 of the second paper transporting roller assembly 30, the motor controller 26 controls the pulse motor 21 to transport the long strip of color paper 1 at the high speed V1 suitable for printing.

At the moment the leader of the color paper 1 reaches a position close to the rollers 31 and 32, that is, when the leader of the color paper 1 has been transported by the predetermined distance L1 from the center of the exposure station EX, the controller 28 provides the motor controller 26 with a deceleration signal to decelerate the driving roller 22 of the first paper transporting roller assembly 20. To prevent the rapid slowing down of the color paper 1, it is preferred to decelerate the pulse motor 21 gradually. Thus, the first paper transporting roller assembly 20 changes the speed of the drive roller 22 to transport the color paper 1 at the slow speed V2. As a result, the first and second paper transporting assemblies 20 and 30 have the same speed of transportation, namely the low speed V2, so that the leader of the color paper 1 can be caught between the rollers 31 and 32 of the second paper transporting roller assembly 30 without jamming.

When the rollers 31 and 32 grab the leader of the color paper 1 and transport it, the leader sensor 34 detects the leader of the color paper 1 and provides the controller 28 with a signal accordingly. As was previously described, in response to the signal from the sensor 34, the controller 28 provides the motor controller 26 with an acceleration signal to increase the speed of transportation of the color paper 1 with the first paper transporting roller assembly 20 up to the high speed V1. At the same time, the controller 28 causes the guide member 25 to turn down away from the color paper 1, allowing the color paper to form a loop in the reservoir section 27. Because the color paper 1 is transported in the printing section 3 at a speed V1 which is higher than the speed V2 at which it is transported in the processing section 4, the color paper 1 is looped in the reservoir section 7 and reserved for a period of time. To provide a sufficiently long loop of the long strip of color paper 1 in the reservoir section 7 to make it possible to continuously process the exposed color paper 1, the second paper transporting roller assembly 30 has its operation suspended for a while, after which the assembly 30 is restarted to transport the color paper after a sufficient length of the color paper 1 is looped. Thereafter, the second paper transporting roller assembly 30 transports the color paper at a speed suitable for processing. The color paper 1 is processed in the processing section 4 and then is dried in the drying section 5.

When the length of loop of the color paper 1 in the reservoir section 7 becomes shorter than a predetermined length, the cutter 6 is actuated to cut off the exposed color paper 1. Then, the above described operation is repeated.

Figure 4:
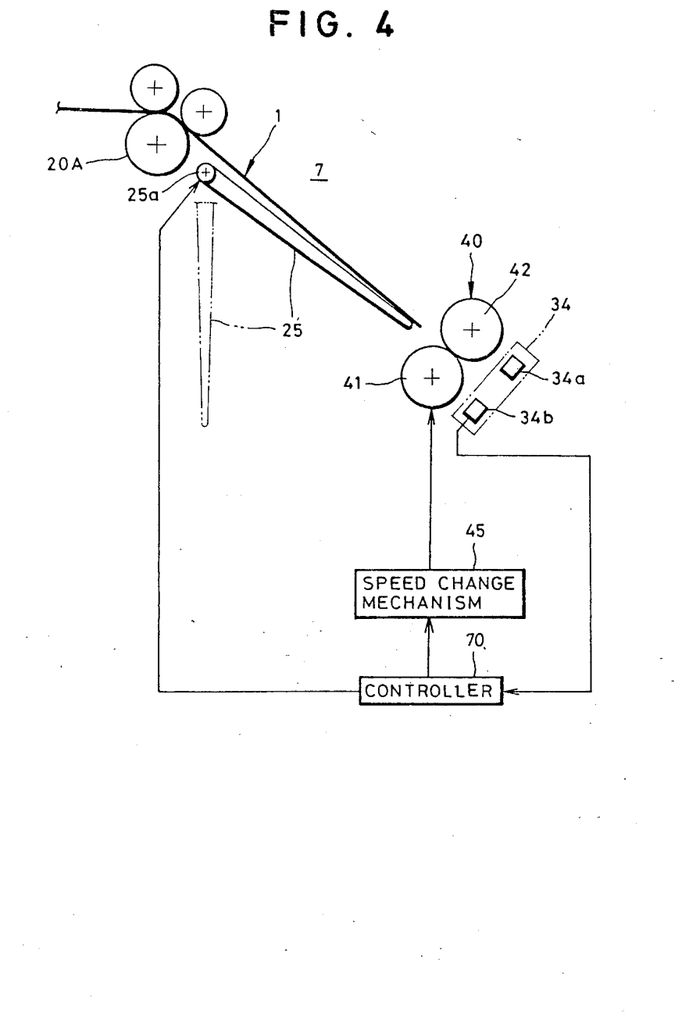
FIG. 4 is a schematic illustration of a long and narrow strip material handling apparatus according to another preferred embodiment of the present invention incorporated in the printing-processing apparatus of FIG. 1.

Referring now to FIGS. 4 to 8, and in particular to FIG. 4, there is shown a long strip handling apparatus according to another preferred embodiment of the present invention. In this embodiment a transporting speed change mechanism associated with a second paper transporting roller assembly 40 is provided. The second paper transporting roller assembly 40 includes a driving roller 41 which is driven by a speed changing device 45, a driving or pinch roller 42, and the leader sensor 34.

Figure 5:
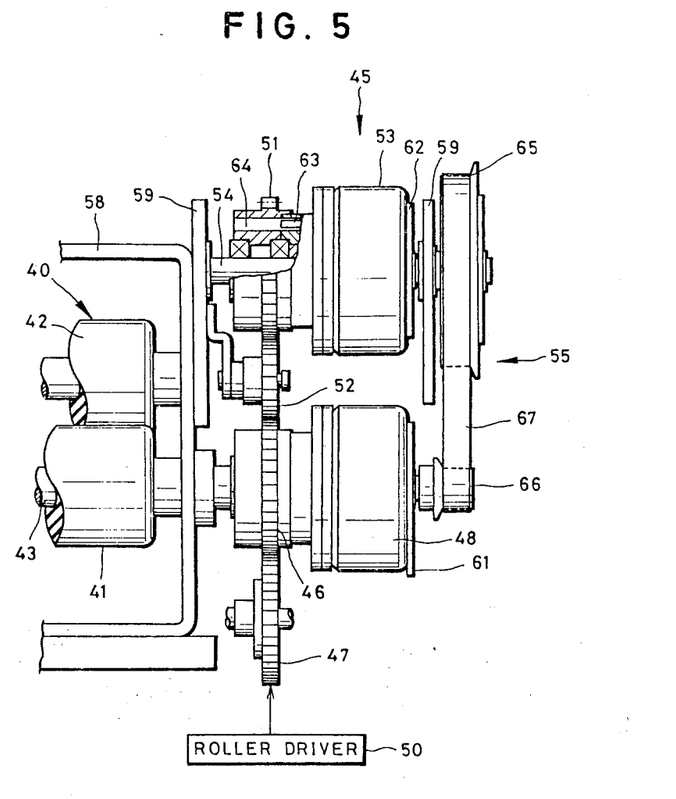
FIG. 5 is a front view of a speed changing mechanism cooperating with a second transporting roller assembly.
Figure 6:
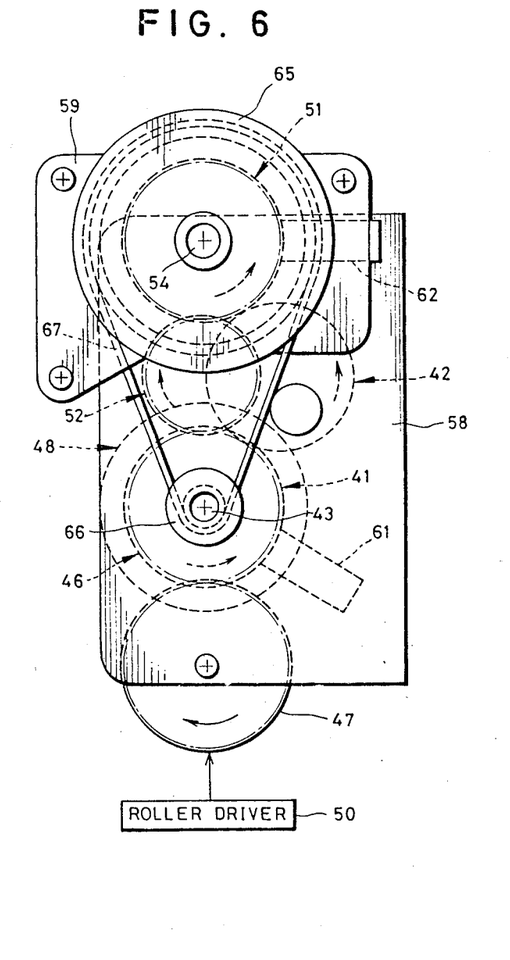
FIG. 6 is, a side view of the speed changing mechanism shown in FIG. 5.

As shown in FIGS. 5 and 6, the speed changing device 45 which is associated with a shaft 43 of the driving roller 41 includes a first gear 46 which is rotatably mounted on the shaft 43 and in mesh with an idler gear 47 operationally connected to a driver 50 and a first clutch 48 disposed between the first gear 46 and the shaft 43, the foregoing constituting a low speed gear train. The speed changing device 45 further includes a second gear 51 coupled to the first gear 46 through an idler gear 52 and a second clutch 53 disposed between the second gear 51 and a shaft 54 rotatably mounting the second gear 51, together constituting a high speed gear train. The shaft 54 of the high speed gear train is coupled to the shaft 43 by a speed increase transmission assembly 55 for transmitting an increasing amount of rotation therebetween. A supporting frame 58 rotatably supports the driving and driven rollers 41 and 42 and has a pair of side plates 59 mounted thereon for supporting the shaft 54 of the second gear 51. Attaching plates 61, 62 support the first and second clutches 48 and 53.

Each of the first and second clutches 48 and 53 for the high and low speed gear trains includes an electromagnetic clutch including a solenoid and a plunger with a connecting pin 63. When the solenoid is energized, the plunger is moved to bring the connecting pin 63 into engagement with a connecting hole 64 formed in the associated gear, thereby enabling locking together or releasing.

The speed increasing transmission 55 includes a large pulley 65 attached to one end of the shaft 54 of the second gear 51 of the high speed gear train, a small pulley 66 attached to one end of the shaft 43 of the driven or pinch roller 42, and an endless belt 67 rotationally connecting the large and small pulleys 65 and 66 without slippage. The belt-pulley speed increasing transmission 55 may be replaced with a gear train to increase the speed of rotation, and the second clutch of the high speed gear train may be disposed between the belt-pulley speed increasing transmission 55 and the shaft of the driving roller 43.

A controller 70 (FIG. 4) controls the speed changing device 45 and the guide member 25 according to the output of the leader sensor 34. As was previously described, the leader sensor 34 detects the leader of the color paper 1 to provide a signal. In the absence of such a signal, the controller 70 causes the guide member 25 to turn up to the guide position about the shaft 25a and, simultaneously, turns the first and second electric solenoids off or on to change the speed of rotation of the second paper transporting roller assembly 40 to the high speed V1. On the other hand, in the presence of such a signal, the controller 70 causes the guide member 25 to turn down and, simultaneously, turns the first and second electric solenoids off or on to change the speed of rotation of the second paper transporting assembly 40 to the low speed V1.

Figure 7:
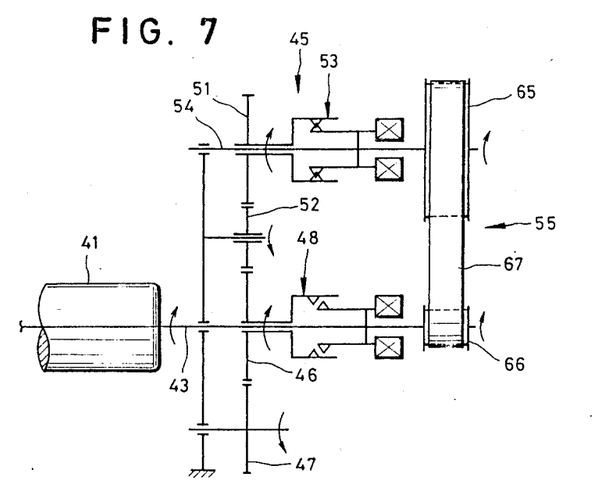
FIG. 7 is a skeleton diagram of the speed changing mechanism shown in FIG. 5 in a high speed range.
Figure 8:
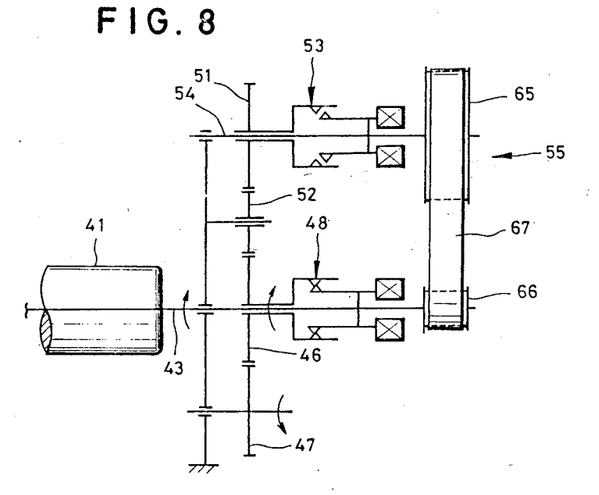
FIG. 8 is a skeleton diagram of the speed changing mechanism shown in FIG. 5 in a low speed range.

The operation of the long strip handling apparatus shown in FIGS. 4 to 6 is best understood from the following description taken in conjunction with FIGS. 7 and 8. At the beginning of operation of the long strip handling apparatus, the controller 70 decides that the printing-processing apparatus is at the beginning of operation, based on the fact that the leader sensor 34 provides no signal. Accordingly, the controller 70 causes the guide member 25 to turn up to the guide position. The speed of the second paper transporting roller assembly 40 is changed to the high speed V1 when the first clutch 48 is released and the second clutch 53 is locked, as shown in FIG. 7. When the speed of the second paper transporting roller assembly 40 is changed to the high speed V1, the transmission of rotation of the idler gear 47 is connected to the driving roller 41 through the gears 46, 52 and 51, second clutch 53, the shaft 54, the speed increasing transmission 55, and the shaft 43. As a result, the second paper transporting roller assembly 40 transports the long strip of color paper 1 at the high speed V1 suitable for printing. Accordingly, the first and second paper transporting assemblies 20 and 40 have the same speed of transportation, namely the high speed V1, so that the leader of the color paper 1 can be grabbed between the rollers 41 and 42 of the second paper transporting roller assembly 40 without jamming.

When the rollers 41 and 42 grab the leader of the color paper 1 and transport it, the leader sensor 34 detects the leader of the color paper 1 and provides the controller 70 with a signal accordingly. As was previously described, in the presence of the signal, the controller 70 provides the speed changing device 45 with a changing signal to lock the first clutch 48 and release the second clutch 53, changing the speed of the second paper transporting assembly 40 to the low speed V2. In this operation, as shown in FIG. 8, the transmission of rotation of the idler gear 37 is connected to the driving roller 41 through the first gear 46, the first clutch 48 and the shaft 43. As a result, the second paper transporting roller assembly 40 transports the long strip of color paper 1 at the low speed V2 suitable for processing.

At the same time, the controller 70 causes the guide member 25 to turn down away from the color paper 1, allowing the color paper to loop in the reservoir section 7. Because the color paper 1 is transported by the first paper transporting roller assembly 20A in the printing section 3 at the speed V1 higher than the speed V2 at which it is transported by the second paper transporting roller assembly 40 in the processing section 4, the color paper 1 is looped in the reservoir section 7 and reserved for a period of time.

To provide a sufficient loop of the color paper 1 in the reservoir section 7 to make it possible to continuously process the exposed color paper 1, the second paper transporting roller assembly 40 has its operation suspended for a while, after which the assembly is restarted to transport the long strip of color paper 1 after a sufficient length of the color paper 1 is looped. It is to be noted that the second transporting roller assembly 40 may be stopped until a long enough section of the color paper 1 to be continuously processed in the processor 4 is reserved in the processor 4. Also, the transmission may use a reduction gear in place of the speed increasing transmission 55 if the paper transporting speed of the first paper transporting roller assembly 20 is slower than that of the second paper transporting roller assembly 40.

Figure 9:
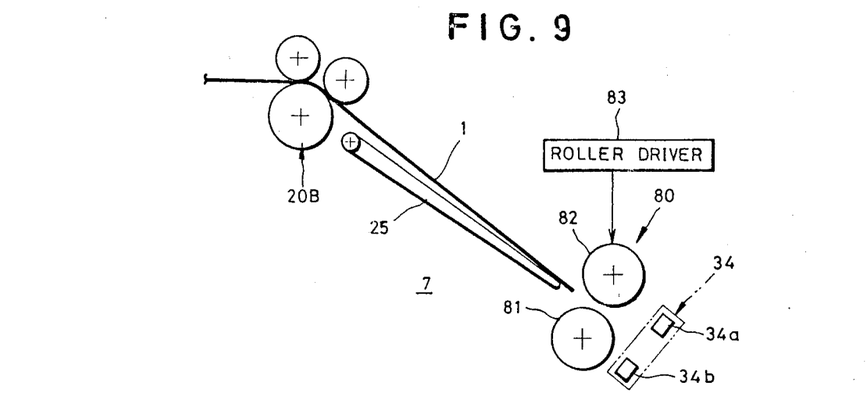
FIG. 9 is a schematic illustration of a long and narrow strip material handling apparatus according to still another preferred embodiment of the present invention incorporated in the printing-processing apparatus of FIG. 1.

Referring now to FIGS. 9 to 12, in particular to FIG. 9, there is shown a long strip handling apparatus according to still another preferred embodiment of the present invention. In this embodiment, the particular feature resides in the provision of a roller separating means associated with a second paper transporting roller assembly 80. The second paper transporting roller assembly 80 includes a driving roller 81 driven by a roller driver 83, a driven or pinch roller 82, the leader sensor 34 and a roller separating mechanism 85.

Figure 10:
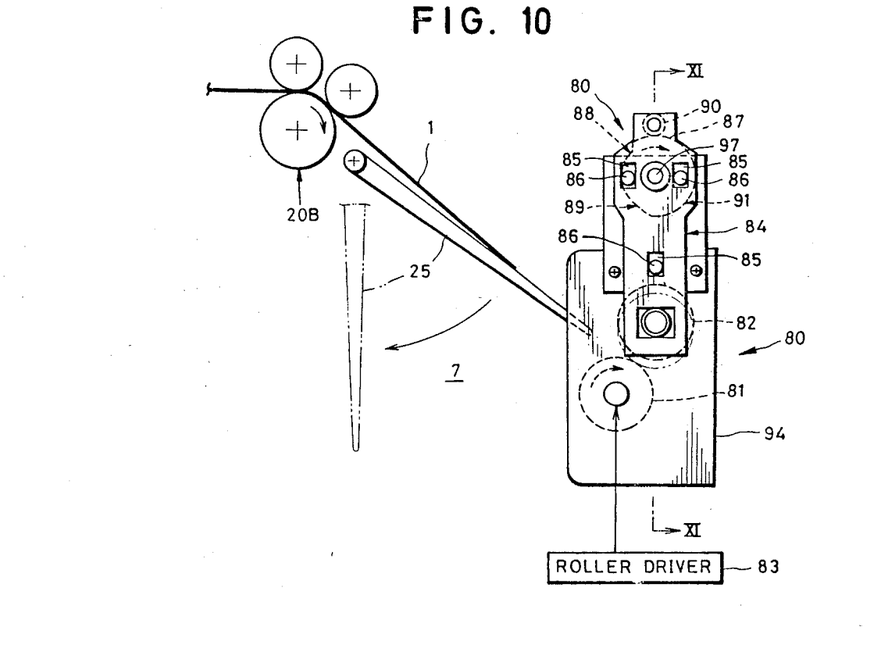
FIG. 10 is a side view of a roller separating mechanism cooperating with a second transporting roller assembly.
Figure 11:
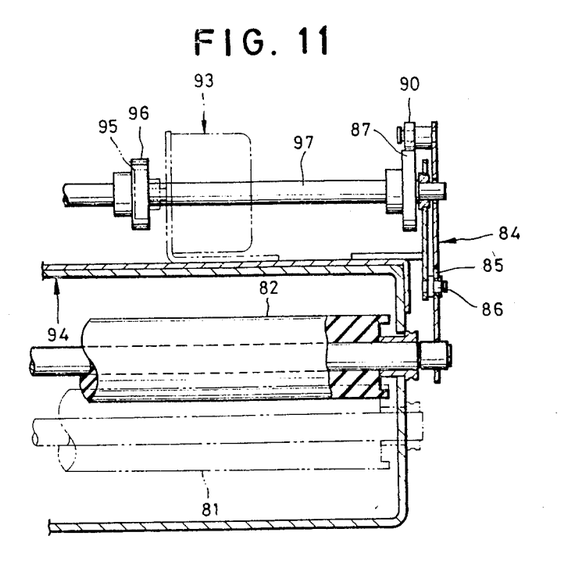
FIG. 11, is a cross sectional view, taken along a line XI—XI in FIG. 10, of the speed changing mechanism shown in FIG. 5

As shown in FIGS. 10 and 11, the pinch roller 82 is supported for rotation by a pair of side supporting plates 84 which are movable up and down. When the supporting plates 84 are moved up, the pinch roller 82 is drawn away from the driving roller 81.

Each supporting plate 84 is formed with three vertical slots 85 parallel to and apart from each other for receiving therein guide pins 86 which are secured to the frame 94 of the apparatus. Through the pin-slot engagement, each supporting plate 84 is provided further with a cam follower pin 90 projecting horizontally therefrom which is in contact with a cam plate 87 mounted on a cam shaft 97 secured to the frame 94 of the apparatus.

The cam plate 87 includes a cam base 88 for allowing the supporting plates 84 to move down to bring the pinch roller 82 into contact with the driving roller assembly 80 to nip and transfer the leader of the long strip of color paper 1 and narrow strip, and a cam robe 89 for moving up the supporting plates 84 from the down position so as to draw the pinch roller 82 apart from the driving roller 81, thereby allowing the leader of the long strip of color paper 1 t pass through.

As shown in FIG. 11, the cam plate 87 is driven by a motor 93 fixedly mounted on the frame 94 which supports the driving roller 81. Rotation of the motor 93 is transmitted to the cam plate 87 through gears 95 and 96 and the cam shaft 97. The cam shaft 97 is provided with a cam position of the cam plate 84 and comprises, for example, a first positioning cam for turning off a micro-switch to stop the motor 93 so as to position the cam plate 87 at a down position, moving down the supporting plate 84 and a second positioning cam for turning off the micro-switch to stop the motor so as to position the cam plate 87 at an up position, moving up the supporting plate 84.

As was previously described, the leader sensor 24 detects the leader of the long strip of color paper 1 and provides a signal accordingly. In the presence of the signal, the motor 93 rotates so as to turn the cam plate 84, positioning the supporting plates 84 to nip the leader of the long and narrow strip while simultaneously moving down the guide member 25.

Figure 12:
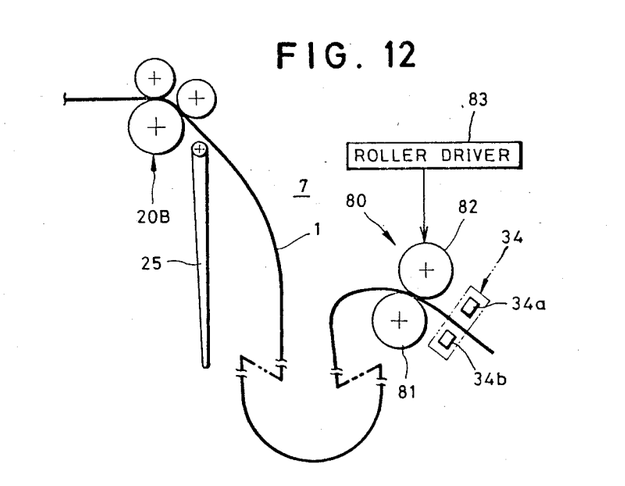
FIG. 12 is an illustration of a looped long strip of color paper reserved in a reservoir chamber of the printer-processor of FIG. 1.

The operation of the long strip handling apparatus shown in FIGS. 9 to 11 is best understood from the following description taken in conjunction with FIG. 12. The long strip of color paper 1 is transferred by the first paper transporting roller assembly 20B toward the processing section 4 after exposure at the printing section 3. At the beginning of operation of the long strip handling apparatus, the guide member 25 is turned up to the guide position. In cooperation with the turning up of the guide roller 25, the motor 93 of the roller separating mechanism 85 is caused to turn, rotating the cam plate 87 to move up the cam follower pin 90 and thereby moving up the supporting plates 84 to separate the pinch roller 82 from the driven roller 81 as shown in FIG. 9. The cam position sensor detects the cam plate 87 at the up position to stop the motor 93.

With the transportation of the color paper 1 by the first paper transporting roller assembly 20, the leader of the color paper 1 enters between the rollers 81 and 82 which are separated from each other. After a while, the leader detector 24 detects the leader of the color paper 1 moving between the rollers 81 and 82 and provides a signal accordingly. In response to the signal. the motor 93 of the roller separating mechanism 85 again is caused to turn, rotating the cam plate 87 to move down the cam follower pin 90 so as thereby to move down the supporting plates 84 to bring the pinch roller 82 in contact with the driven roller 81. As a result, the second paper transporting roller assembly 80 nips the leader of the color paper 1. In cooperation with this, the guide roller 25 is turned down. Thereafter, because the first paper transfer roller assembly 20B transfers the color paper at a speed higher than that of the second paper transfer roller assembly 80, the color paper loops in the reservoir section 7 as shown in FIG. 12 and is temporarily reserved for a period of time.

Although the present invention has been fully described by the preferred embodiments thereof with reference to the accompanying drawings, various changes and modifications within the scope and spirit of the invention will be apparent to those skilled in the art.

What is claimed is:

1. An apparatus for transporting a long strip material between a first processing section, which includes first transporting means which transports said long strip material lengthwise at a first speed in said first processing section, and a second processing section wherein said long strip material is transported lengthwise at a second speed different from said first speed, said apparatus comprising:

second transporting means, disposed before said second processing section, for grabbing said long strip material, and for transporting said long strip material lengthwise at a speed substantially equal to second disposed speed;

a reservoir section, disposed between said second transporting means and said second processing section, for temporarily reserving said long strip material therein;

a guide member, disposed in said reservoir section, for guiding the leading end of said long strip material toward said second transporting means, said guide member being movable away from said leading end of said long strip material after said long, strip material is grabbed by said second transporting means; and speed changing means for changing the speed of lengthwise transportation of said long strip material to said second speed before said leading end of said long strip material passes through said second transporting means, and to said first speed after said leading end of said long strip material has passed through second said transporting means.

2. An apparatus for transporting a long strip material between a first processing section, which includes first transporting means which transports said long strip material lengthwise at a first speed in said first processing section, and a second processing section wherein said long and narrow strip material is transported lengthwise at a second speed slower than said first speed, said apparatus comprising:

second transporting means, comprising a pair of rollers and disposed before said second processing section, for grabbing said long strip material lengthwise, and for transporting said long and narrow strip material at a speed substantially equal to said second speed;

a reservoir section, provided between said second transporting means and said second processing section for temporarily storing said long strip material in a loop therein;

a guide member, disposed in said reservoir section, for guiding the leading end of said long strip material toward said second transporting means, said guide member being movable away from said leading end of said long strip material after said long strip material is grabbed by said second transporting means;

a leader sensor for detecting whether said leading end of said long strip material has passed through said second transporting means and providing a signal accordingly; and speed changing means for changing a speed of said first transporting means as to transport said long strip material at said second speed in the absence of said signal from said leader sensor and at said first speed in the presence of said signal from the leader sensor.

3. An apparatus as defined in claim 2, wherein said speed changing means includes means for changing the speed of said first transporting means gradually to said second speed.

4. An apparatus as defined in claim 2, wherein said long strip material comprises photographic paper and said first processing section comprises a printing section, and wherein said photographic paper is exposed in said first processing section, and said second processing section comprises a developing section wherein said exposed photographic paper is developed.

5. An apparatus as defined in claim 3, wherein said long strip material comprises photographic paper and said first processing section comprises a printing section, and wherein said photographic paper is exposed in said first processing section, and said second processing section comprises a developing section wherein said exposed photographic paper is developed.

6. An apparatus for transporting a long strip material between a first processing section, which includes first transporting means which transports said long strip material lengthwise at a first speed in said first processing section, and a second processing section wherein said long strip material is transported lengthwise at a second speed slower than said first speed, said apparatus comprising:
   second transporting means, comprising a pair of rollers and disposed before said second processing section, for grabbing said long strip material lengthwise and transporting it at a speed substantially equal to said second speed;
   a reservoir section, provided between said first transporting means and said second processing section, for temporarily reserving said long strip material in a loop therein;
   a guide member, disposed in said reservoir section, for guiding the leading end of said long strip material toward said second transporting means, said guide member being movable away from said leading end of said long strip material after said long strip material is grabbed by said second transporting means;
   a leader sensor for detecting whether said leading end of said long strip material has passed through said second transporting means and providing a signal accordingly; and
   speed changing means for changing a speed of said second transporting means so as to transport said long strip material at said first speed in the absence of said signal from said leader sensor and at said second speed in the presence of said signal from the leader sensor.

7. An apparatus as defined in claim 6, wherein said speed changing means comprises:
   a rotary shaft having either one of said pair of rollers of said second transporting means securely mounted thereon;
   a gear rotatably mounted on said rotary shaft;
   a transmission disposed between said gear and said rotary shaft;
   a first clutch disposed between said gear and said rotary shaft for connecting and disconnecting the gear and rotary shaft; and
   a second clutch incorporated in said transmission,
   said first clutch being disconnected while said second clutch is connected when said leading end of said long strip material passes said second transporting means, and said first clutch being disconnected and said second clutch being connected after said leading end of said long strip material has passed said second transporting means.

8. An apparatus as defined in claim 7, wherein said long strip material comprises photographic paper and said first processing section comprises a printing section wherein said photographic paper is exposed, and wherein said second processing section comprises a developing section wherein said exposed photographic paper is developed.

9. An apparatus as defined in claim 8, wherein said transmission transmits an increased rotation of said gear to said rotary shaft.

10. An apparatus for transporting a long strip material between a first processing section, which includes first transporting means which transports a long strip material lengthwise at a first speed in said first processing section, and a second processing section wherein said long strip material is transported lengthwise at a second speed slower than said first speed, said apparatus comprising:
    second transporting means, comprising a pair of rollers and disposed before said second processing section, for grabbing said long strip material lengthwise to transport it at a speed substantially equal to said second speed;
    a reservoir section, provided between said first transporting means and said second processing section, for temporarily storing said long strip material in a loop therein;
    a guide member, disposed in said reservoir section, for guiding the leading end of said long strip material toward said first transporting means, said guide member being movable away from said leading end of said long strip material after said long strip material is grabbed by said second transporting means;
    a leader sensor for detecting whether said leading end of said long strip material has passed through said second transporting means and providing a signal accordingly; and
    roller separating means for separating said pair of rollers of said second transporting means from each other when said long strip material passes between said pair of rollers in the absence of said signal from said leader sensor, and bringing the pair of rollers into contact with each other so as to grab said leading end of said long strip material therebetween after said long strip material has passed between said pair of rollers in the presence of said signal from the leader sensor.

11. An apparatus as defined in claim 10, further comprising at least one rotary shaft on which one of said pair of rollers is mounted, wherein said pair of said roller separating means includes a cam member which cooperates with said rotary shaft to cause up and down movement of said rotary shaft.

12. An apparatus as defined in claim 10, wherein said long strip material comprises photographic paper, said first processing section comprises a printing section wherein said photographic paper is exposed, and said second processing section comprises a developing section wherein said exposed photographic paper is developed.

13. An apparatus as defined in claim 11, wherein said long strip material comprises photographic paper, said first processing section comprises a printing section wherein said photographic paper is exposed, and said second processing section comprises a developing section wherein said exposed photographic paper is developed.

* * * * *